May 24, 1927.
G. W. VOELKEL
1,629,604
HAY STACKING DEVICE
Filed May 22, 1926
2 Sheets-Sheet 1
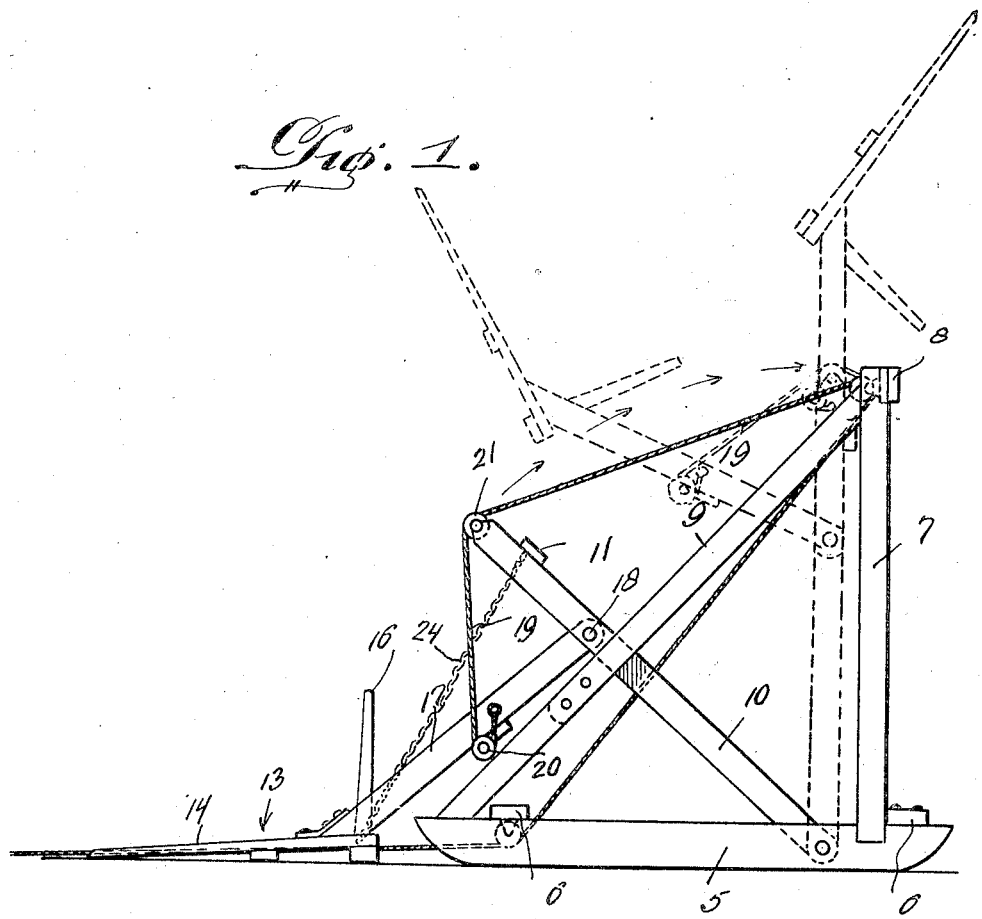
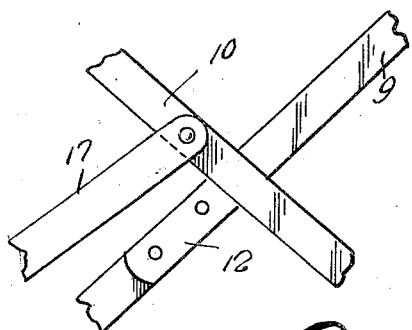
Inventor
G. W. Voelkel,
By Clarence A. O'Brien
Attorney

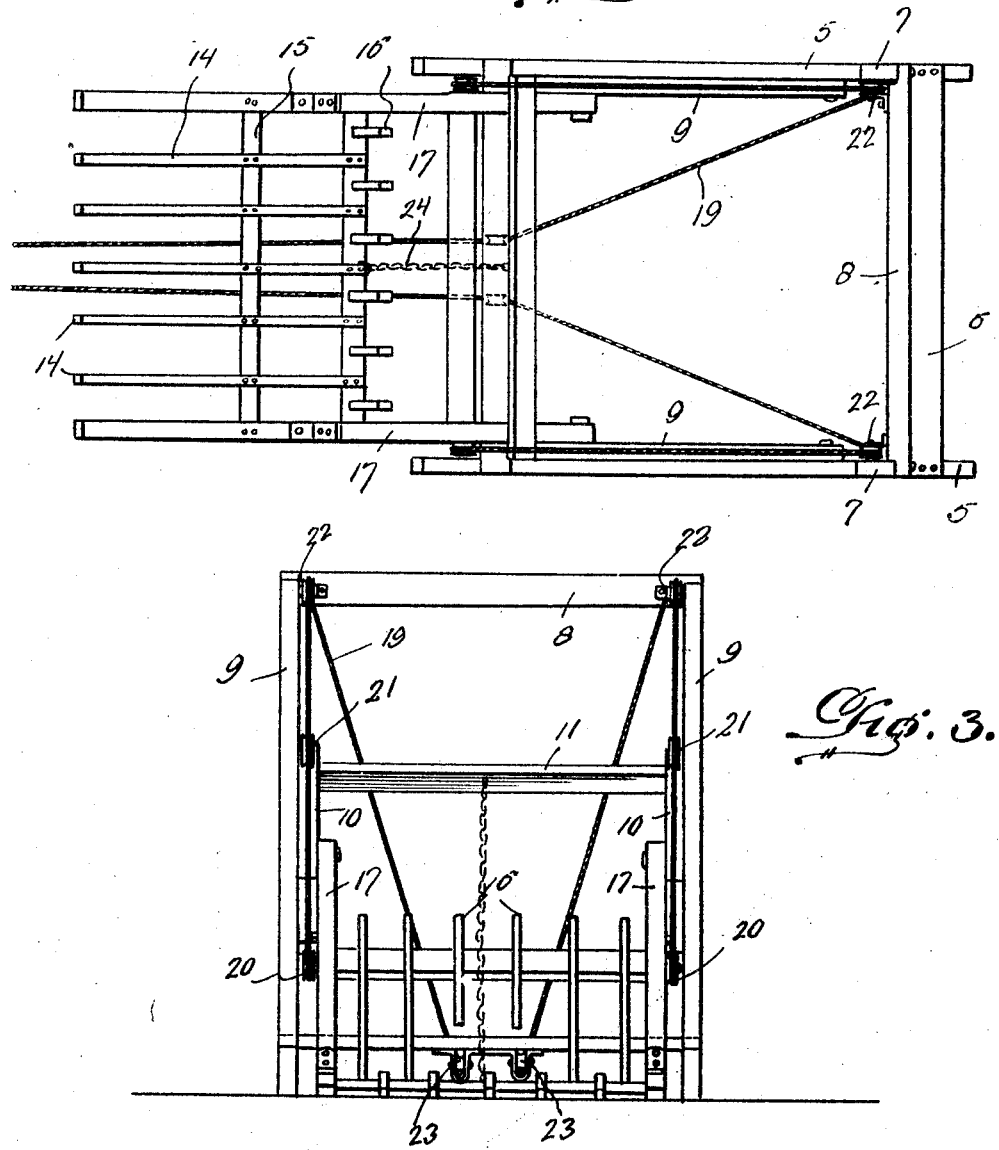

Patented May 24, 1927.

1,629,604

UNITED STATES PATENT OFFICE.

GEORGE W. VOELKEL, OF NASHVILLE, ILLINOIS, ASSIGNOR OF ONE-HALF TO HARRY I. STEVENS, OF TAMAREA, ILLINOIS.

HAY-STACKING DEVICE.

Application filed May 22, 1926. Serial No. 111,029.

This invention relates to hay stackers and has for its primary object to provide a device that is particularly adapted for use in conjunction with a bull rake, in order that a load of hay gathered by the bull rake may be discharged onto the device and then thrown upwardly onto the stack by attaching the operating cables of the device to the bull rake which will provide the power for the device when the rake is turned and then moved from the stacker.

A further object of the invention resides in the provision of a stacking device wherein the carriage mechanism which is adapted to be moved upwardly for throwing the hay onto the stack is so constructed as to prevent the dropping of the hay from off the carriage until the same is in a relatively vertical position, and even when in this position, preventing the hay from dropping upon the frame of the device.

A still further object resides in the provision of a hay stacking device wherein the carriage is so associated with the frame to permit the ready raising and lowering of the same without requiring an unusual amount of power.

Other objects will become apparent as the nature of the invention is better understood, the same comprising the novel form, combination and arrangement of parts hereinafter more fully described, shown in the accompanying drawing and claimed.

In the drawings wherein like reference characters indicate corresponding parts throughout the various views:

Figure 1 is a side elevation of a hay stacking device constructed in accordance with the present invention, the hay receiving and elevating carriage being disclosed in full line lowered position, and in dotted line raised and partially raised position.

Figure 2 is a top plan view of the device.

Figure 3 is a front elevation thereof, and

Figure 4 is an enlarged fragmentary inner elevation of one side of the carriage attaching and elevating frame and the stationary guide bar therefor.

Now having particular reference to the drawings, my novel hay stacking device constitutes the provision of a pair of spaced horizontally extending bars 5—5 that are interconnected at their upper edges and at their opposite ends by cross bars 6—6 serving as a skid in order that the device may be readily moved over the surface of the ground, the opposite ends of the bars being curved as clearly shown in Figure 1 to permit of such action.

Extending vertically from the rear ends of the skid bars 5—5 and secured thereto are posts 7—7 that are interconnected at their upper ends by a cross beam 8, and that are braced to the forward ends of said skid bars by inclined beams 9—9 that are bolted or otherwise suitably secured at their opposite ends to said posts and said skids.

Pivoted to the inner sides of the skid bars 5—5 slightly forwardly of the posts 7—7 are forwardly and upwardly extending carriage attaching bars 10—10, the free ends of which project beyond the beams 9—9 at the inner sides thereof and are arranged in close relation with said beams. Said bars 10—10 are connected adjacent their outer ends by a cross beam 11, and for limiting the downward pivotal movement of the bars with respect to the skid bars 5—5, said beams 9—9 are provided upon their inner faces with stop lugs 12, as shown in Figure 4, upon which the carriage attaching bars 10—10 will rest when the carriage is in a lowered position as more clearly disclosed in Figure 1.

The stacking device further constitutes the provision of a hay receiving and elevating carriage designated generally by the numeral 13, the same consisting of a hay receiving platform that is constructed of spaced horizontally extending bars 14 that are interconnected at two or more spaced points by cross bars 15 one of which is at the extreme inner end of the platform and from which vertically extend the teeth 16.

The carriage further constitutes the provision of a pair of rearwardly extending and upwardly inclined bars 17—17 that are bolted at their forward lower ends to the rear side of the platform, and at their upper inner ends are pivotally secured as at 18 to the before mentioned bars 10—10 forwardly of the inclined skid beams 9—9 in order that said carriage may be raised or lowered with respect to the bars as disclosed by the full and dotted lines in Figure 1.

Anchored to the inclined bars 17—17 of the carriage 13 at the outer sides thereof are cables 19—19 that extend downwardly around pulleys 20—20 upon the lower edges of the bars 17—17 slightly forwardly of the anchorage of said cables, which cables then extend upwardly and are trained over pulleys 21—21 upon the forward ends of the bars 10—10 to which said cables are anchored. The cables then extend rearwardly and are trained around pulleys 22—22 upon the cross beam 8 at the upper ends of the skid posts 7—7, after which they are extended inwardly, downwardly and forwardly and then trained beneath the pulleys 23—23 and upon the under side of the forward skid connecting bar 6, suitable guide brackets being also arranged upon said bar for preventing the disengagement of the cables from said pulleys as clearly disclosed in Figure 3. The cables are then extended beneath the carriage 13 in order that the same may be attached to the bull rake that is adapted to discharge its load upon the carriage in order that the carriage may be raised when the bull rake is driven from the device for throwing the load upon a stack.

In operation, when power is applied to the cables, the bars 10—10 are moved to an upright position as per the dotted lines in Figure 1. Due to the weight of the load upon the carriage 13, said carriage will maintain the same relative position with respect thereto as disclosed in the full lines of Figure 1, and also in the intermediate dotted lines of the same figure. As soon as the bars 10—10 have reached their limit of swinging movement, the carriage will then be thrown over into the second dotted line position of Figure 1 for consequently pitching the hay upon the pile.

In order to prevent the carriage from dropping too far down as the same falls from a vertical position to the ground, the rear edge of the carriage is secured to the cross bar 11—11 between the inclined bars 10—10 by reason of a cable or chain 24.

The specific operation as well as the detailed features of construction will be readily apparent to those skilled in the art by a consideration of the foregoing specification when read in accompaniment with the drawings filed as a part of this application, and even though I have herein shown and described the device as constituting certain detail structural elements, it is nevertheless to be understood that departures may be had therefrom without affecting the spirit and scope of the appended claims.

Having thus described the invention, what I claim as new and desire to secure by Letters Patent is:—

1. In a hay stacking device of the character described, a skid including a pair of spaced interconnected skid bars, a pair of vertical posts at the rear thereof, and inclined connecting beams between the upper ends of the posts and the forward ends of the skid bars, a pair of forwardly and upwardly extending bars pivotally secured to the skid bars adjacent their rear ends and extending forwardly between the inclined beams of said skids, a hay receiving carriage, rearwardly extending inclined bars secured to said carriage and pivotally secured to said last mentioned bars forwardly of the skid beams, means for limiting the downward swinging movement of the bars upon the skid and means for facilitating the upward swinging movement upon said bars and the vertical swinging movement of the bars upon said skid for discharging the hay from said carriage.

2. In a hay stacking device of the character described, a skid including a pair of spaced interconnected skid bars, a pair of vertical posts at the rear thereof, and inclined connecting beams between the upper ends of the posts and the forward ends of the skid bars, a pair of forwardly and upwardly extending bars pivotally secured to the skid bars adjacent their rear ends and extending forwardly between the inclined beams of said skids, a hay receiving carriage, rearwardly extending inclined bars secured to said carriage and pivotally secured to said last mentioned bars forwardly of the skid beams, means for limiting the downward swinging movement of the bars upon the skid and means for facilitating the upward swinging movement upon said bars and the vertical swinging movement of the bars upon said skid for discharging the hay from said carriage, said carriage including means for preventing the discharge of the hay therefrom until in a substantially vertical position with respect to the skid.

In testimony whereof I affix my signature.

GEORGE W. VOELKEL.